Nov. 8, 1927.

L. E. LA BRIE

BRAKE ANCHOR

Filed March 9, 1927

1,648,185

INVENTOR
LUDGER E. LA BRIE
BY
*M. W. McConkey*
ATTORNEY

Patented Nov. 8, 1927.

1,648,185

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE ANCHOR.

Application filed March 9, 1927. Serial No. 173,825.

This invention relates to brakes, and is illustrated as embodied in an internal expanding automobile brake. An object of the invention is to provide an inexpensive but very rigid support for the anchor or anchors of the brake, or for equivalent parts.

Preferably the support is a stamping, having a concave face engaging the backing plate of the brake, or a like support, and compressed by the anchor so that it is held resiliently under tension.

The above and other objects and features of the invention, including various novel and desirable details of construction, will be apparent from the following description of the illustrative embodiments shown in the accompanying drawing, in which.

Figure 1:
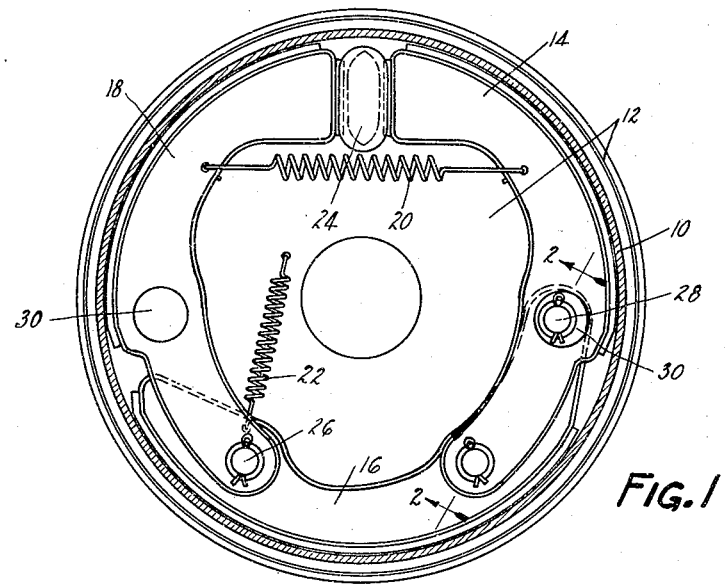
Figure 1 is a vertical section through the brake, just inside the head of the brake drum, and showing the brake shoes in side elevation.
Figures 2, 3:
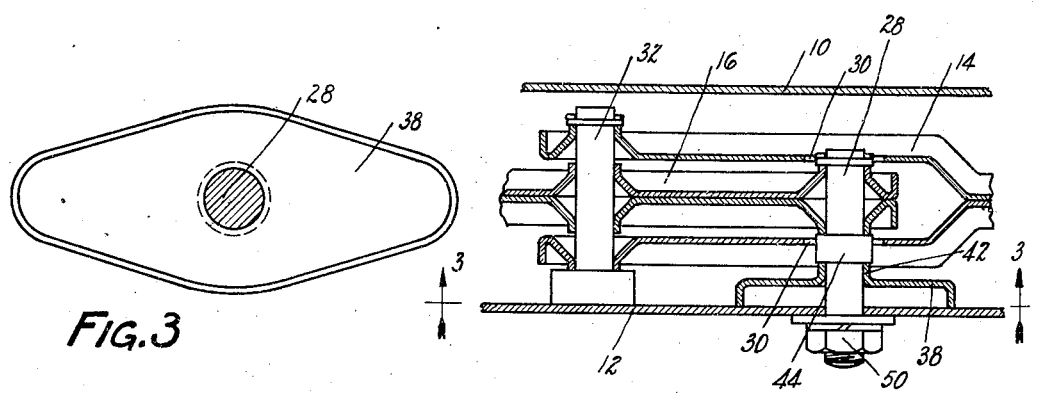
Figure 2 is a partial section on the line 2—2 of Figure 1, showing the brake anchor.
Figure 3 is a section on the line 3—3 of Figure 2, showing in side elevation the concave face of the novel bracket.
Figure 4:
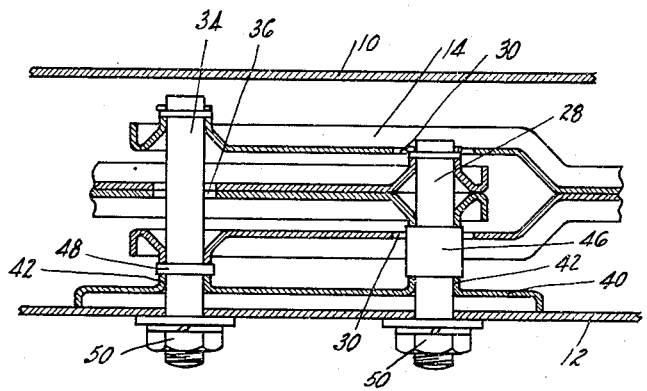
Figure 4 is a section corresponding to Figure 2, but showing a double anchor arrangement.

The brake selected for illustration is a three-shoe brake of the type fully described in Patent No. 1,567,716, granted Bendix Brake Company on December 29, 1925, on application of A. Y. Dodge. It includes generally a rotatable drum 10, and a backing plate or other support 12 for three shoes 14, 16 and 18 arranged inside of the drum. As fully explained in the Dodge patent, and as shown in Figures 2 and 4, shoes 14 and 18 are forked to straddle the opposite ends of shoe 16.

The brake is applied, against the resistance of suitable return springs 20 and 22, by means such as a double cam 24.

Shoes 16 and 18 are connected by a floating pivot 26, and shoe 16 is anchored on a fixed pivot 28 passing through clearance openings 30 in shoe 14, which openings are also shown in shoe 18 to make it interchangeable with shoe 14. Shoe 14 is either connected to shoe 16 by a floating pivot 32, as in Figure 2, or else is anchored on a fixed pivot 34 passing through a clearance opening 36 in shoe 16, as in Figure 4.

The present invention relates to the provision of an inexpensive but very rigid support for anchor 28, or anchors 28 and 34, by providing a bracket 38 (Figure 2) or 40 (Figure 4), which is preferably a steel stamping so pressed as to form a concave face engaging the backing plate 12. I prefer to draw out integral sleeves 42 to embrace anchors 28 and 34, to give an extended bearing therefor.

Each of the anchors or pivots 28 and 34 has a portion such as a collar 44, 46, or 48, engaging the end of the corresponding sleeve 42, and cooperating with a nut 50 on the end of the anchor in compressing the bracket 38 or 40 against the backing plate to hold the two resiliently together under considerable tension.

While two illustrative embodiments have been described in detail, it is not my intention to limit the scope of the invention to those particular embodiments, or otherwise than by the terms of the appended claims.

I claim:

1. A brake anchor comprising, in combination, a support, a concave bracket arranged with its concave side toward the support, and an anchor passing through the support and bracket and holding them under tension against each other.

2. A brake anchor comprising, in combination, a support, a bracket, one of which has a concave side facing toward the other, and an anchor passing through the support and bracket and holding them under tension against each other.

3. A stamped bracket for a brake anchor having a concave face and a drawn anchor-embracing sleeve projecting on the side opposite the concave face.

4. A stamped bracket for a brake anchor having a concave face and an anchor arranged to compress the bracket to hold it under resilient tension.

5. A pivot and mounting comprising two elements arranged to rest against each other, at least one of which is concave on the side next the other, a pivot passing through said elements and having a portion engaging one of them on the side opposite the other, and a nut threaded on the pivot and engaging said other element and resiliently compressing the elements between itself and said portion of the pivot.

6. A mounting comprising two elements arranged to rest against each other, at least one of which is concave on the side next the other, two pivots passing through said elements near their opposite ends and each having a portion engaging one of the elements on the side opposite the other, and a nut threaded on each pivot and engaging said other element and resiliently compressing the elements between itself and said portion of the corresponding pivot.

7. A stamped brake anchor bracket of elongated form and concave on one side and formed to support two anchor pivots.

In testimony whereof, I have hereunto signed my name.

LUDGER E. LA BRIE.